United States Patent [19]

Malmendier

[11] 3,917,488
[45] Nov. 4, 1975

[54] HIGH ELASTIC MODULUS BORATE GLASS

[75] Inventor: Joseph W. Malmendier, South Corning, N.Y.

[73] Assignee: Corning Glass Works, Corning, N.Y.

[22] Filed: Apr. 29, 1974

[21] Appl. No.: 464,935

Related U.S. Application Data

[63] Continuation-in-part of Ser. No. 269,982, July 10, 1972, abandoned.

[52] U.S. Cl. ................................. 106/50; 106/47 R
[51] Int. Cl.² .................... C03C 13/00; C03C 3/00
[58] Field of Search .................. 106/50, 47 R, 47 Q

[56] References Cited
UNITED STATES PATENTS

| | | | |
|---|---|---|---|
| 2,090,098 | 8/1937 | Berger et al. | 106/47 R |
| 2,996,392 | 8/1961 | Bromer et al. | 106/47 Q |
| 3,044,888 | 7/1962 | Provance | 106/50 |
| 3,183,104 | 5/1965 | Thomas | 106/50 |
| 3,385,915 | 5/1968 | Hamling | 106/50 |
| 3,573,078 | 3/1971 | Bacon | 106/50 |
| 3,620,787 | 11/1971 | McMarlin | 106/50 |

OTHER PUBLICATIONS

Moore et al., "Study of Glasses Consisting of Oxides of Elements of Low Atomic Weight," J. Soc. Glass Tech., 40 (1956), pp. 66–67, 72, 85.

Loewenstein, "Studies in the Compositions & Structure of Glass Possessing High Young's Module," Parts I and II, Phys. & Chem. of Glasses 2(3,4) (1961), pp. 69–82, 119–125.

*Primary Examiner*—Patrick P. Garvin
*Assistant Examiner*—Mark Bell
*Attorney, Agent, or Firm*—Clinton S. Janes, Jr.; Clarence R. Patty, Jr.

[57] ABSTRACT

This invention relates to the manufacture of fibers from essentially silica-free glasses in the ternary system $B_2O_3$-$Al_2O_3$-MgO which exhibit elastic moduli in excess of $13 \times 10^6$ psi. The inclusion of such high field strength modifiers as $TiO_2$, $Ta_2O_5$, $La_2O_3$, $CeO_2$, $ZrO_2$, $Y_2O_3$, and BeO can increase the elastic moduli to values above $19 \times 10^6$ psi.

3 Claims, 1 Drawing Figure

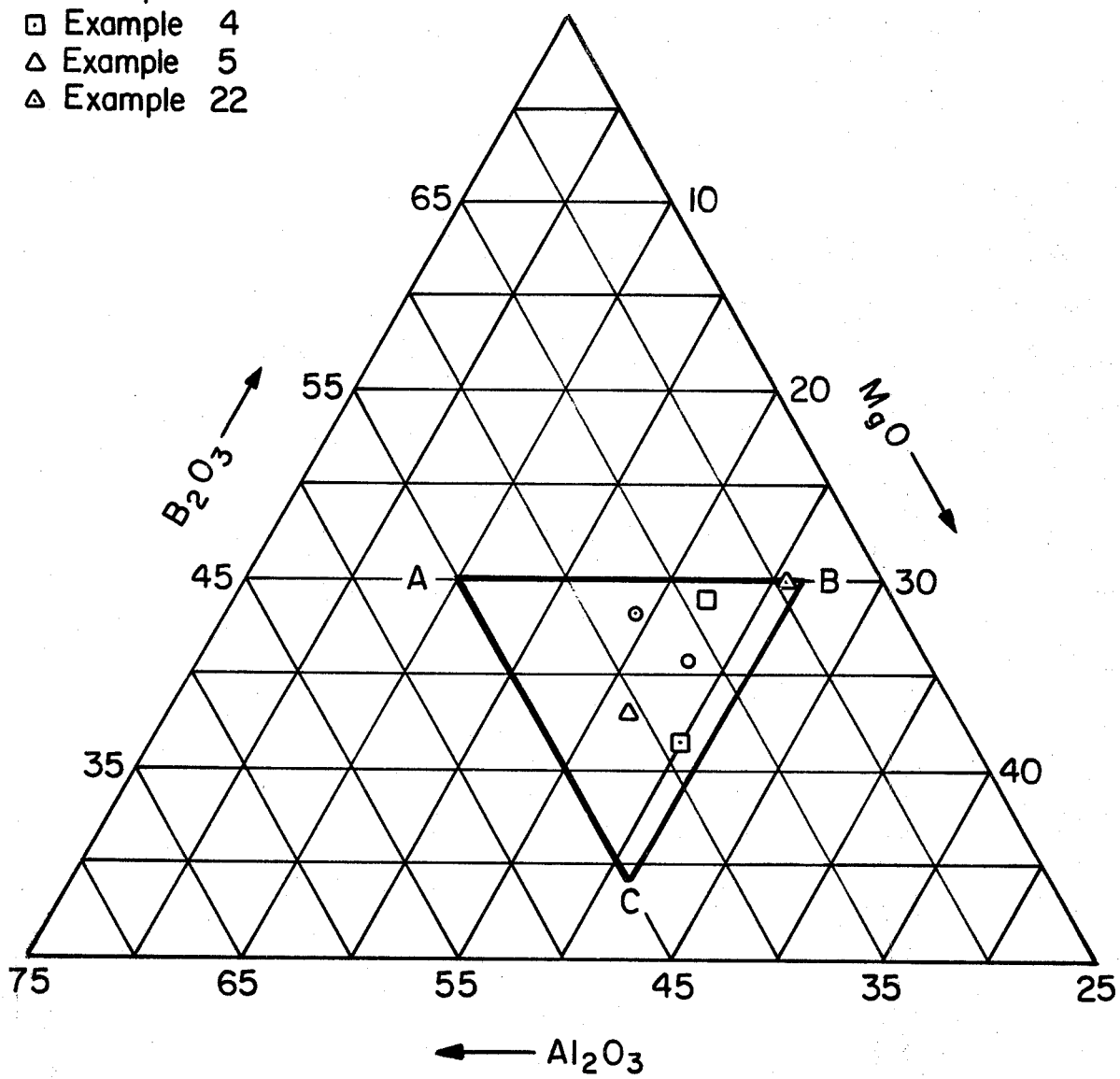

HIGH ELASTIC MODULUS BORATE GLASS

This application is a continuation-in-part of my copending application Ser. No. 269,982, filed July 10, 1972, and now abandoned.

In recent years there has been increased interest in the development of fibers for reinforcing a wide spectrum of matrices, ranging from such materials as cements and concretes to plastics to exotic metals and alloys. This research into fiber production has encompassed such diverse materials as metallic filaments and crystalline whiskers. However, because of the relative ease of manufacture and comparative low cost of the final product, a great portion of this investigative enterprise has been directed in the field of glass fibers.

In general, the prime desiderata of the research into fibers suitable as reinforcing agents have been high mechanical strength coupled with high elastic modulus to yield a product exhibiting a high modulus-to-density ratio. The property of elastic modulus is of vital importance in providing resistance to flexure to composites wherein fibers comprise the reinforcing medium. Fibers of such materials as boron and carbon are recognized to possess these characteristics but the costs of production thereof are extremely high, plus such shortcomings inherent therein of poor resistance to oxidation and/or a proclivity to react chemically with the matrix materials, have combined to render such fibers of limited practical utility.

Inasmuch as glass fibers can be produced through relatively conventional techniques and are normally essentially inert to the matrix materials within which they are entrained, extensive effort has been expended to develop glass compositions demonstrating high moduli of elasticity with particular emphasis in securing high modulus-to-density ratios.

Therefore, the principal object of the instant invention is to provide glass fibers exhibiting very high elastic moduli coupled with a high elastic modulus-to-density ratio.

That object can be secured through glasses in the ternary system $MgO-Al_2O_3-B_2O_3$ with, preferably, the addition of such high field strength modifiers as $TiO_2$, $Ta_2O_5$, $La_2O_3$, $CeO_2$, $ZrO_2$, $Y_2O_3$, and BeO. More particularly, the glasses of this invention consist essentially, by weight on the oxide basis, of about 7–26% MgO, 10–45% $Al_2O_3$, and 20–45% $B_2O_3$ with, preferably, up to 50 percent total of the following high field strength modifiers in the indicated proportions selected from the group consisting of 0–10% $TiO_2$, 0–40% $Ta_2O_5$, 0–50% $La_2O_3$, 0–25% $CeO_2$, 0–10% $ZrO_2$, 0–35% $Y_2O_3$, and 0–15% BeO, the total of MgO + BeO not exceeding about 26 percent. The presence of such well known network formers as $SiO_2$ and $P_2O_5$, such strong fluxes as the alkali metal oxides except for $Li_2O$, and such network modifiers as the other alkaline earth metal oxides should be avoided to achieve the desired high elastic modulus. The inclusion of the above-cited high field strength modifiers can also be effective in improving the melting and forming capabilities of a glass or in altering the physical properties exhibited thereby. Hence, the addition of those ingredients in small amounts can serve a useful function from this aspect of glass technology as well as effecting a beneficial effect upon the elastic modulus of the glass. Likewise, $Li_2O$ in minor amounts can be a useful additive since it can act as a flux without seriously degrading the elastic modulus of the glass.

The single drawing appended to the specification comprises a three-component diagram wherein area ABCD delineates the glass forming region of the simple $B_2O_3-MgO-Al_2O_3$ ternary expressed in weight percent. The composition of Examples 1–5 and 22 of Table I, infra, have been located on the drawing. The substantial effect which additions of the cited high field strength modifiers can exert on broadening the glass-forming capability of the simple three-component system can readily be appreciated through a comparison of area ABC with the operable limits of $B_2O_3$, MgO, and $Al_2O_3$ possible where such additions are made.

In view of the extensive research which has been conducted in recent years, the patent literature in the area of high elastic modulus glasses is quite prolific. However, each of those patents contemplates the inclusion of $SiO_2$ as the primary network forming ingredient whereas the instant glasses are, preferably, $SiO_2$-free and utilize $B_2O_3$ for that purpose.

Glasses in the alkaline earth-$Al_2O_3-B_2O_3$ composition field are not novel per se to the prior art as is evidenced by U.S. Pat. Nos. 2,090,098 and 2,996,392 and British Pat. No. 708,698. Nevertheless, an examination of those specifications will elicit features distinguishing them from the instant invention.

Thus, U.S. Pat. No. 2,090,098 describes glasses which are stated to be resistant to attack by hot metal vapors and, in particular, by sodium vapor. Those glasses were composed, by weight, of 10–40% $B_2O_3$, 10–35% $Al_2O_3$, and 25–80% bivalent metal oxides including MgO, CaO, BeO, BaO, and ZnO. The preferred glasses are free from $SiO_2$, $ZrO_2$, $ThO_2$, $Sb_2O_3$, $As_2O_3$, PbO, and the alkali metal oxides. BaO is the preferred bivalent metal oxide employed. There is no reference whatsoever to high elastic modulus glasses and the compositions recited are outside of the required MgO-$Al_2O_3-B_2O_3$ field of the present invention.

U.S. Pat. No. 2,996,392 discloses optical glasses exhibiting high indices of refraction consisting essentially by weight of 16–32% $B_2O_3$, 10–23% $Al_2O_3$, 25–50% $La_2O_3$, and 8–50% bivalent metal oxides including MgO, CaO, BaO, and CdO with, optionally, up to 10% $ZrO_2$ and $Ta_2O_5$. Here, again, there is not even an allusion to glass fibers exhibiting high elastic modulus and the patentees equate the utility of MgO with CaO, BaO, and CdO for their purpose. Such finding is directly opposed to the instant invention which teaches the unique utility of MgO among the bivalent metal oxides in imparting a high elastic modulus to an aluminoborate base glass fiber.

British Pat. No. 708,698 is another disclosure relating to glasses which are resistant to attack by alkali vapors. The approximate compositions consist essentially, by weight, of 30–65% $B_2O_3$, 10–20% $Al_2O_3$, 0.1–10% MgO, and 10–25% CaO, with, optionally, up to 15% BeO. As in the two above-discussed patents, there is no mention of high elastic modulus glasses and the required presence of CaO would destroy that property, as is explained in the instant invention.

Moore and McMillan in "A Study of Glasses Consisting of the Oxides of Elements of Low Atomic Weight," *Journal of the Society of Glass Technology*, 40, pp. 66 ff. (1956) also discuss glasses within the $MgO-Al_2O_3-B_2O_3$ system. At page 72, the authors provide a ternary composition diagram derived from melting minuscule batches (0.5 gm). The glass forming area delineated, expressed in mole percent, comprised compositions ranging between about 25–45% MgO, 5–20% $Al_2O_3$, and 40–60% $B_2O_3$ which, when converted to weight percent, calculate to about 15.7–29.4% MgO, 8.8–30.3% $Al_2O_3$, and 45.4–62.2% $B_2O_3$. However, where larger batches were employed (50 gm), the glass forming area shrunk to a small, unspecified range approximating the center of that area. The authors make no mention of the elastic moduli exhibited by such glasses and the composition ranges cited are outside those found operable in the present invention.

Where glasses of the instant invention are formed solely within the base $MgO-Al_2O_3-B_2O_3$ compositions, elastic moduli greater than $14 \times 10^6$ psi and, frequently, in excess of $15 \times 10^6$ will be achieved with annealed bodies of substantial bulk within the above prescribed ranges of those components. The addition of one or more of the above cited high field strength modifiers in any significant amount will normally yield elastic moduli greater than $15 \times 10^6$ psi and, in certain instances, can provide an elastic modulus in excess of $19 \times 10^6$ psi. Based upon the ability to secure the highest modulus, the preferred compositions consist essentially, by weight, of about 8–20% MgO, 10–45% $Al_2O_3$, 20–40% $B_2O_3$, and at least 5 percent of the high field strength modifiers.

In general, elastic modulus values measured on annealed glass bodies of substantial bulk will be somewhat greater than those determined on fibers or other unannealed, fine-dimensioned bodies. However, the relative ease of measurement and the high precision of the techniques that have been developed for determining elastic modulus on bulk glass samples, have led to a reliance upon the results obtained on such samples. Also, where, as is customary in experimental laboratory practice, glass fibers are hand drawn from a crucible melt, glass quality and dimensional uniformity will frequently be poorer than can be achieved with larger glass bodies. For example, in larger bodies, grinding and polishing can be utilized to shape the articles to desired dimensions. Moreover, the difference in modulus values observed in annealed bodies vis-a-vis unannealed samples, viz, about one order of magnitude more, appears to be relatively constant over the range of compositions encompassed within the present invention, so that measurements conducted on annealed articles permit the estimation of elastic modulus of unannealed bodies with a reasonable degree of confidence as to the value derived.

Table I records the compositions, in weight percent on the oxide basis, of several glasses coming within the requirements of the instant invention along with a number of examples outside the proper ranges of the components. The actual batch ingredients can comprise any materials, either the oxides or other compounds which, on being melted together, are converted to the desired oxide in the proper proportions. The batches (about 1000 grams) were compounded and the components ballmilled together except where a beryllium compound was present. Since beryllium oxides and most other beryllium compounds, with the exception of beryl ore, are highly toxic, care must be exercised in the steps for manufacturing BeO-containing glasses. Unfortunately, beryl is a silicate and so cannot be considered a practical batch material for these glasses. The batches were run into platinum-20 percent rhodium crucibles and those crucibles heated for 4 hours at 1650°C. in an electrically heated furnace. Fibers were hand drawn and the remainder of the melts cast into steel molds to produce slabs about $5 \times 5 \times \frac{1}{2}$. The molds containing the slabs were immediately transferred to an annealer operating at the proper temperature to assure good annealing.

TABLE I

|  | 1 | 2 | 3 | 4 | 5 | 6 | 7 | 8 |
|---|---|---|---|---|---|---|---|---|
| $B_2O_3$ | 40.35% | 42.98% | 43.82% | 36.04% | 37.68% | 35.18% | 41.48% | 39.56% |
| $Al_2O_3$ | 36.29 | 37.47 | 33.86 | 38.8 | 40.5 | 35.38 | 28.32 | 34.61 |
| MgO | 23.36 | 19.55 | 22.32 | 25.16 | 21.82 | 23.41 | 24.02 | 19.93 |
| $TiO_2$ | — | — | — | — | — | 6.03 | 6.18 | 5.9 |
| $Ta_2O_5$ | — | — | — | — | — | — | — | — |
| $CeO_2$ | — | — | — | — | — | — | — | — |
| $La_2O_3$ | — | — | — | — | — | — | — | — |
| BeO | — | — | — | — | — | — | — | — |

|  | 9 | 10 | 11 | 12 | 13 | 14 | 15 |
|---|---|---|---|---|---|---|---|
| $B_2O_3$ | 38.21% | 30.09% | 35.81% | 32.29% | 30.87% | 26.12% | 38.51% |
| $Al_2O_3$ | 33.6 | 26.38 | 31.39 | 28.36 | 24.82 | 14.0 | 41.31 |
| MgO | 22.17 | 17.45 | 20.76 | 18.70 | 17.87 | 15.12 | 16.7 |
| $TiO_2$ | 6.02 | — | — | — | — | — | — |
| $Ta_2O_5$ | — | 26.08 | — | — | — | — | — |
| $CeO_2$ | — | — | 12.04 | — | — | — | — |
| $La_2O_3$ | — | — | — | 20.65 | 26.44 | 44.76 | — |
| BeO | — | — | — | — | — | — | 3.48 |

|  | 16 | 17 | 18 | 19 | 20 | 21 | 22 | 23 |
|---|---|---|---|---|---|---|---|---|
| $B_2O_3$ | 39.35% | 39.77% | 22.42% | 34.42% | 33.57% | 31.86% | 45.0% | 30.16% |
| $Al_2O_3$ | 42.19 | 42.67 | 13.97 | 39.72 | 27.06 | 21.48 | 28.94 | 26.28 |
| MgO | 11.39 | 8.62 | 15.03 | 21.39 | 19.44 | 18.42 | 26.06 | 17.44 |
| $Ta_2O_5$ | — | — | — | — | — | — | — | 26.12 |
| $La_2O_3$ | — | — | 44.50 | — | — | — | — | — |
| CdO | — | — | — | — | — | — | — | — |
| $Y_2O_3$ | — | — | — | — | 19.93 | 28.24 | — | — |
| $ZrO_2$ | — | — | — | 4.47 | — | — | — | — |
| BeO | 7.07 | 8.94 | — | — | — | — | — | — |
| $SiO_2$ | — | — | — | — | — | — | — | — |
| $TiO_2$ | — | — | 4.08 | — | — | — | — | — |

|  | 24 | 25 | 26 | 27 | 28 | 29 | 30 |
|---|---|---|---|---|---|---|---|
| $B_2O_3$ | 27.65% | 28.34% | 33.08% | 35.14% | 24.21% | 29.20% | 28.07% |
| $Al_2O_3$ | 27.78 | 19.04 | 17.80 | 28.60 | 12.97 | 36.25 | 15.03 |
| MgO | 18.39 | 16.40 | 19.16 | 25.35 | 14.00 | 19.57 | 16.23 |
| $Ta_2O_5$ | 26.18 | — | — | — | 28.10 | — | — |
| $La_2O_3$ | — | 36.22 | — | — | 20.72 | — | 24.02 |
| CdO | — | — | 29.96 | 15.91 | — | — | — |

TABLE I-continued

|  | 1 | 2 | 3 | 4 | 5 | 6 | 7 | 8 |
|---|---|---|---|---|---|---|---|---|
| $Y_2O_3$ | — | — | — | — | — | 14.98 | 16.65 | |
| $ZrO_2$ | — | — | — | — | — | — | — | |
| BeO | — | — | — | — | — | — | — | |
| $SiO_2$ | — | — | — | — | — | — | — | |
| $TiO_2$ | — | — | — | — | — | — | — | |

|  | 31 | 32 | 33 | 34 | 35 | 36 | 37 | 38 |
|---|---|---|---|---|---|---|---|---|
| $B_2O_3$ | 37.44% | 45.88% | 41.14% | 34.58% | 35.73% | 32.70% | 39.75% | 36.19% |
| $Al_2O_3$ | 36.38 | 35.20 | 35.87 | 42.99 | 38.30 | 35.05 | 34.75 | 38.78 |
| MgO | 21.66 | 11.68 | 8.91 | 8.69 | 15.48 | 14.16 | 23.17 | 10.47 |
| ZnO | — | — | — | — | 10.49 | — | — | — |
| $ZrO_2$ | 4.52 | — | — | — | — | — | — | — |
| BeO | — | 7.24 | 9.24 | 9.00 | — | — | — | — |
| $SiO_2$ | — | — | 4.84 | 4.74 | — | — | — | — |
| BaO | — | — | — | — | — | 18.09 | — | — |
| $Li_2O$ | — | — | — | — | — | — | 2.33 | — |
| CdO | — | — | — | — | — | — | — | 14.56 |

|  | 39 | 40 | 41 | 42 | 43 | 44 | 45 | 46 |
|---|---|---|---|---|---|---|---|---|
| $B_2O_3$ | 54.33% | 44.81% | 38.16% | 32.86% | 31.2% | 38.09% | 48.65% | 60.17% |
| $Al_2O_3$ | 27.53 | 39.55 | 44.32 | 48.12 | 45.7 | 33.76 | 23.19 | 12.70 |
| MgO | 18.14 | 15.64 | 17.52 | 19.02 | 23.1 | 28.15 | 28.16 | 27.13 |
| ZnO | — | — | — | — | — | — | — | — |
| $ZrO_2$ | — | — | — | — | — | — | — | — |
| BeO | — | — | — | — | — | — | — | — |
| $SiO_2$ | — | — | — | — | — | — | — | — |
| BaO | — | — | — | — | — | — | — | — |
| $Li_2O$ | — | — | — | — | — | — | — | — |
| CdO | — | — | — | — | — | — | — | — |

Table II sets forth various physical properties that were measured on the working examples reported in Table I. The values recorded were determined in accordance with measuring techniques conventional in glass technology. Except where noted otherwise, the elastic moduli were measured on bar samples having a ¼ cross section in accordance with the practice set forth in ASTM Designation: C 623-71. Elastic modulus was determined on the fiber samples utilizing an ultrasonic measuring technique such as is described by L. C. Lynnworth, "Ultrasonic Measurement of Elastic Moduli in Slender Specimens Using Extensional and Tersional Wave Pulses," *Journal of Testing and Evaluation*, 1, No. 2, March, 1973, pp. 119–125.

TABLE II

|  | 1 | 2 | 3 | 4 | 5 | 6 | 7 | 8 | 9 |
|---|---|---|---|---|---|---|---|---|---|
| Liquidus, °C. | 1381 | 1423 | 1342 | 1432 | 1382 | 1371 | 1245 | >1471 | 1380 |
| Softening Point, °C. | 770 | 770 | 750 | 770 | 760 | 760 | 750 | 760 | 750 |
| Annealing Point, °C. | 643 | 670 | 650 | 640 | 656 | 641 | 640 | 633 | 640 |
| Strain Point, °C. | 608 | | | | 629 | 614 | | 604 | |
| Expansion Coefficient $(25°-300°C.)\times10^{-7}/°C.$ | 53.6 | 51.8 | 53.3 | 55.3 | 52.3 | 56.1 | 56.7 | 52.4 | 53.9 |
| Density, g/cm³ | 2.612 | 2.584 | 2.585 | 2.63 | 2.635 | 2.698 | 2.657 | 2.658 | 2.673 |
| Poisson's Ratio | 0.29 | 0.29 | 0.29 | 0.29 | 0.29 | 0.29 | 0.29 | 0.29 | 0.29 |
| Elastic Modulus ($\times 10^6$ psi) | 14.94 | 14.46 | 14.72 | 15.13 | 15.21 | 15.73 | 14.99 | 15.05 | 15.67 |
| Elastic Modulus/Density ($\times 10^6$ psi) | 5.72 | 5.60 | 5.69 | 5.75 | 5.77 | 5.83 | 5.64 | 5.66 | 5.86 |
| Elastic Modulus--Fibers ($\times 10^6$ psi) | 13.67 | 13.42 | 13.85 | | | | | | |

|  | 10 | 11 | 12 | 13 | 14 | 15 | 16 | 17 | 18 |
|---|---|---|---|---|---|---|---|---|---|
| Liquidus, °C. | 1319 | 1389 | 1313 | 1309 | 1330 | | 1407 | | 1271 |
| Softening Point, °C. | 770 | 745 | 750 | 760 | 720 | | 755 | 750 | 730 |
| Annealing Point, °C. | 650 | 650 | 630 | 633 | 624 | | 690 | 675 | 632 |
| Strain Point, °C. | | | | 606 | 599 | | | | 608 |
| Expansion Coefficient $(25°-300°C.)\times10^{-7}/°C.$ | 53.1 | 52.4 | 60.5 | 63.7 | 77.7 | | 48.5 | | 80.6 |
| Density, g/cm³ | 3.208 | 2.841 | 3.028 | 3.155 | 3.669 | 2.634 | 2.620 | 2.589 | 3.786 |
| Poisson's Ratio | 0.29 | 0.30 | 0.30 | 0.30 | 0.30 | 0.28 | 0.29 | | 0.30 |
| Elastic Modulus ($\times 10^6$ psi) | 16.29 | 15.39 | 15.76 | 15.63 | 16.15 | 16.37 | 17.33 | 19.52 | 17.49 |
| Elastic Modulus/Density ($\times 10^6$ psi) | 5.08 | 5.40 | 5.20 | 4.95 | 4.40 | 6.21 | 6.61 | 7.54 | 4.62 |
| Elastic Modulus--Fibers ($\times 10^6$ psi) | | 14.27 | | | | | | | |

|  | 19 | 20 | 21 | 22 | 23 | 24 | 25 | 26 | 27 |
|---|---|---|---|---|---|---|---|---|---|
| Liquidus, °C. | | 1361 | | 1260 | | | | | |
| Softening Point, °C. | 720 | 770 | 760 | 760 | | 760 | 745 | 715 | 745 |
| Annealing Point, °C. | 630 | 650 | 670 | 640 | | 650 | 640 | 630 | 645 |
| Strain Point, °C. | | 620 | | | | | | | |
| Expansion Coefficient $(25°-300°C.)\times10^{-7}/°C.$ | | 60.9 | | 58.1 | | | | | |
| Density, g/cm³ | 3.391 | 2.977 | 3.144 | 2.581 | 3.198 | 3.243 | 2.707 | 3.236 | 2.911 |
| Poisson's Ratio | 0.30 | | | 0.29 | 0.29 | | 0.29 | 0.29 | 0.29 |
| Elastic Modulus ($\times 10^6$ psi) | 15.80 | 16.88 | 18.15 | 14.09 | 16.00 | 17.37 | 15.85 | 15.65 | 15.46 |
| Elastic Modulus/Density | | | | | | | | | |

TABLE II-continued

|  | 1 | 2 | 3 | 4 | 5 | 6 | 7 | 8 | 9 |
|---|---|---|---|---|---|---|---|---|---|
| (× 10⁶ psi) | 4.66 | 5.67 | 5.77 | 5.46 | 5.00 | 5.36 | 5.86 | 4.84 | 5.31 |
| Elastic Modulus--Fibers (× 10⁶ psi) |  |  |  |  |  | 15.19 |  |  |  |

|  | 28 | 29 | 30 | 31 | 32 | 33 | 34 | 35 | 36 |
|---|---|---|---|---|---|---|---|---|---|
| Liquidus, °C. |  |  |  |  |  |  | Devitrified During Forming To Glass |  |  |
| Softening Point, °C. | 750 | 770 | 740 | 760 | 780 | 770 |  | 730 | 750 |
| Annealing Point, °C. | 640 | 650 | 650 | 650 | 670 | 680 |  | 650 | 630 |
| Strain Point, °C. |  |  |  |  |  |  |  |  |  |
| Expansion Coefficient (25°–300°C.)×10⁻⁷/°C. |  |  |  |  |  |  |  |  |  |
| Density, g/cm³ | 3.156 |  | 3.512 | 2.686 | 2.562 | 2.552 |  | 2.783 | 2.863 |
| Poisson's Ratio |  |  |  |  |  |  |  |  |  |
| Elastic Modulus (× 10⁶ psi) | 15.52 |  | 17.79 | 16.17 | 17.17 | 17.89 |  | 15.77 | 13.07 |
| Elastic Modulus/Density (× 10⁶ psi) | 4.92 |  | 5.07 | 6.02 | 6.70 | 7.01 |  | 5.667 | 4.565 |
| Elastic Modulus--Fibers (× 10⁶ psi) |  |  |  |  | 16.7 |  |  |  |  |

|  | 37 | 38 | 39 | 40 | 41 | 42 | 43 | 44 | 45 | 46 |
|---|---|---|---|---|---|---|---|---|---|---|
| Liquidus, °C. |  |  | 1270 |  |  |  |  |  |  |  |
| Softening Point, °C. |  | 740 | 760 |  |  |  |  |  |  |  |
| Annealing Point, °C. |  | 630 | 636 |  |  |  |  |  |  |  |
| Strain Point, °C. |  |  | 601 |  |  |  |  |  |  |  |
| Expansion Coefficient (25°–300°C.)×10⁻⁷/°C. |  |  | 51.2 |  |  |  |  |  |  |  |
| Density, g/cm³ | 2.588 | 2.639 | 2.488 |  |  |  |  |  |  |  |
| Poisson's Ratio |  |  | 0.29 |  |  |  |  |  |  |  |
| Elastic Modulus (× 10⁶ psi) | 14.57 | 13.98 | 13.6 |  |  | Devitrified During Forming To Glass |  |  |  |  |
| Elastic Modulus/Density (× 10⁶ psi) | 5.63 | 5.297 | 5.466 |  |  |  |  |  |  |  |
| Elastic Modulus--Fibers (× 10⁶ psi) |  |  | 12.62 |  |  |  |  |  |  |  |

That the above-defined ranges of components are vital in securing glasses having the desired high elastic moduli can be confirmed from a study of Tables I and II along with the following general observations. Hence, where less than about 20% $B_2O_3$ is utilized, the glasses become extremely difficult to form in good quality, whereas, with quantities greater than 45%, the value of the elastic modulus falls below about $13 \times 10^6$ psi. Further, when the $Al_2O_3$ content exceeds about 45%, the liquidus of the glass rises to so high a temperature that normal glass handling techniques become ineffective and at $Al_2O_3$ contents less than about 10 percent the viscosity of the glass at the liquidus becomes so low that conventional glass forming practices are unavailable. Still further, where MgO is present in quantities less than about 7%, the elastic modulus will slip below $14 \times 10^6$ psi and with amounts in excess of 26 percent the liquidus becomes too high. Finally, although even a very minor addition of a high field strength modifier will exhibit some effect, both upon modulus and in improving the melting and forming capabilities of the glass, at least 5 percent thereof is normally demanded to impart a substantial improvement in the elastic modulus demonstrated by the base glass. The maximum recited for each of the modifiers is founded upon its effect upon the liquidus and the stability of the base glass.

The avoidance of constituents exclusive of the indicated effective proportions of MgO, $Al_2O_3$, $B_2O_3$, and the high field strength modifiers has been emphasized above and illustrated in the examples set out in Tables I and II. Examples 39–46 exhibit the adverse effects upon elastic modulus and/or upon the melting and forming problems which can result when the three base components are included in amounts outside of those specified. Thus, Example 39 shows the effect upon modulus and Examples 40–46, in the relatively large-sized laboratory melts employed here, devitrified upon cooling thereby illustrating their inability to be shaped utilizing conventional glass forming techniques. Examples 34–36 and 38 demonstrate the very deleterious effect upon elastic modulus and/or other properties which the additions of various extraneous materials such as $SiO_2$, CdO, CaO, and BaO can bring about. This, of course, is not to say that minor amounts, perhaps up to 10 percent by weight total, cannot be tolerated. However, it is quite apparent that the highest elastic moduli and best glass stability will be secured where the glass composition consists solely of MgO, $Al_2O_3$, $B_2O_3$, and the high field strength modifiers.

I claim:

1. A glass fiber exhibiting an elastic modulus in excess of $13 \times 10^6$ psi consisting essentially, by weight on the oxide basis, of a composition within area ABC of the appended drawing.

2. A glass fiber exhibiting an elastic modulus in excess of $13 \times 10^6$ psi consisting essentially, by weight on the oxide basis, of about 7–26% MgO, 10–45% $Al_2O_3$, 20–45% $B_2O_3$, and up to 50 percent total of at least one high field strength modifier in the indicated proportion selected from the group consisting of 0–10% $TiO_2$, 0–40% $Ta_2O_5$, 0–50% $La_2O_3$, 0–25% $CeO_2$, 0–10% $ZrO_2$, 0–35% $Y_2O_3$, and 0–15% BeO, the total of MgO + BeO not exceeding about 26 percent, said glass being essentially free from $SiO_2$, $P_2O_5$, the alkali metal oxides other than $Li_2O$, and the alkaline earth metal oxides other than MgO.

3. A glass fiber according to claim 2 consisting essentially, by weight on the oxide basis, of about 8–20% MgO, 10–45% $Al_2O_3$, 20–40% $B_2O_3$, and at least 5 percent total of said high field strength modifiers.

* * * * *

UNITED STATES PATENT OFFICE
CERTIFICATE OF CORRECTION

PATENT NO. : 3,917,488
DATED : November 4, 1975
INVENTOR(S) : Joseph W. Malmendier It is certified that error appears in the above-identified patent and that said Letters Patent are hereby corrected as shown below:

Column 4, line 32, "5 X 5 X 1/2." should be -- 5" X 5" X 1/2". --.

Columns 5 and 6, Table I continued, Example Nos. "1, 2, 3, 4, 5, 6, 7, 8" should be -- 24, 25, 26, 27, 28, 29, 30 --.

Columns 7 and 8, Table II continued, Example Nos. "1, 2, 3, 4, 5, 6, 7, 8, 9" should be -- 19, 20, 21, 22, 23, 24, 25, 26, 27 --.

Signed and Sealed this fourth Day of May 1976

[SEAL]

Attest:

RUTH C. MASON
*Attesting Officer*

C. MARSHALL DANN
*Commissioner of Patents and Trademarks*